Oct. 6, 1970   A. R. JONES, JR., ET AL   3,532,434
PHOTOMETER CONSTRUCTION
Filed Dec. 5, 1967

INVENTORS:
ALAN RICHARDSON JONES
CHARLES W. CHAPMAN, Jr.
ROBERT P. McLEROY
BY
Dawson, Tilton, Fallon & Lungmus
ATT'YS

United States Patent Office 3,532,434
Patented Oct. 6, 1970

3,532,434
PHOTOMETER CONSTRUCTION
Alan Richardson Jones, Miami, Charles W. Chapman, Jr., Miami Lakes, and Robert P. McLeroy, Miramar, Fla., assignors, by mesne assignments, to American Hospital Supply Corporation, Evanston, Ill., a corporation of Illinois
Filed Dec. 5, 1967, Ser. No. 688,087
Int. Cl. G01j 3/46, 3/48, 3/50
U.S. Cl. 356—178        7 Claims

ABSTRACT OF THE DISCLOSURE

A photometer for use in analyzing fluid samples passed in rapid succession through a cuvette. A plurality of electrically-conductive photocells are arranged for exposure to light passing through the cuvette and reflected from a single source. The photocells are associated with filters adapted to transmit only certain different wave lengths of light to each of the cells and the current conducted by each cell may be selectively detected and translated into a value representing a characteristic of the fluid being tested.

BACKGROUND

Electrically resistive photocells, such as cadmium sulfide cells, have a number of properties which make them highly desirable for use in photometric equipment. Compared with other photocells of earlier design, cadmium sulfide cells are relatively small, inexpensive, and reliable. Despite these advantages, however, such electrically resistive photocells have a major shortcoming which limits their usefulness in automated chemical analysis equipment. It has been observed that such cells have characteristic and undesirable persistence effects when successive tests are conducted at different wave lengths, specifically when a reading at a given wave length follows one taken at a higher wave length. While such effects are dissipated in a matter of minutes, even short occasional delays cannot be tolerated in the operation of an automatic chemical analyzer having other components which operate at a rapid and regular pace.

SUMMARY

The present invention overcomes the aforementioned problems by providing a photometer having a plurality of electrically resistive photocells each operable only at certain distinctive and pre-selected wave lengths. The multiple cells are all exposed to reflected light originating from a single source but each cell is accompanied by a filter which blocks all but certain selected wave lengths therefrom. The blocked light, rather than being absorbed, is reflected back into the system so that it is available to other filter-photocell units of the combination. Thus, each filter-photocell unit extracts from the total supply of available light from a single source only certain selected wave lengths of light without diminishing the light available to other filter-photocell units set for different wave length reception. Readings at different wave lengths are therefore obtained not by changing the filter for a single photocell but by simply detecting the response of the particular photocell of the group which is exposed to light at the selected wave length. Since the exposure of each cell to a selected wave length or wave length range does not change, the problem of undesirable persistence effects is completely avoided.

Full utilization of the light from a single source is achieved by arranging such cells in opposing pairs at right angles to the path of light passing through a cuvette, by utilizing filters which reflect in directions transverse to the main beam all wave lengths except those to be received by the immediately associated photocells, and by interposing in the main beam and between the opposing pairs of photocells a plurality of angularly-oriented beam splitters which reflect a minor percentage of the light impinging on them and which transmit the remainder.

THE DRAWINGS

Figure 1:
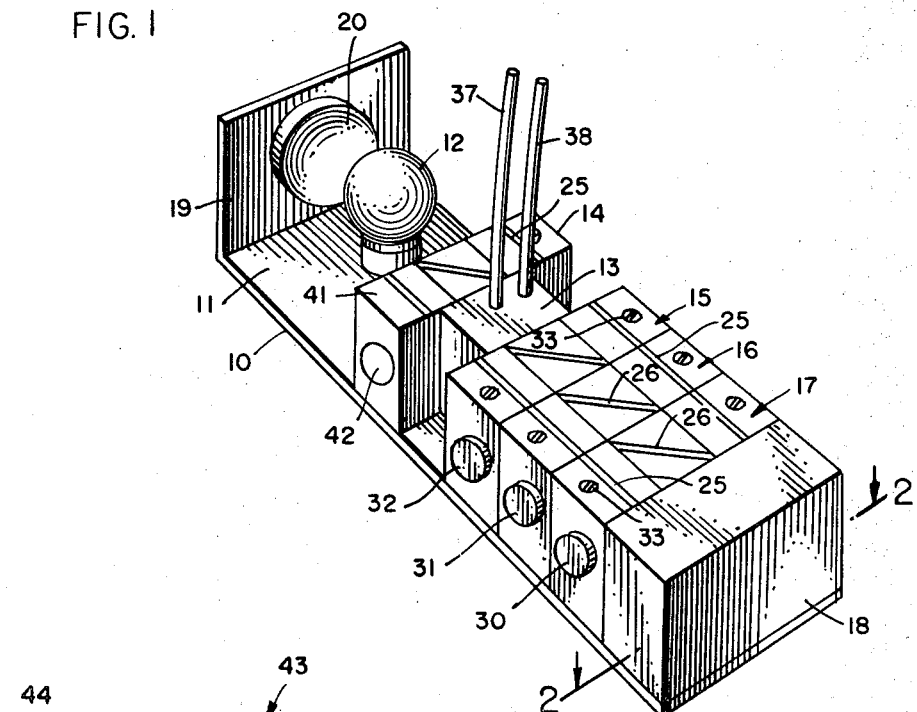
Figure 2:
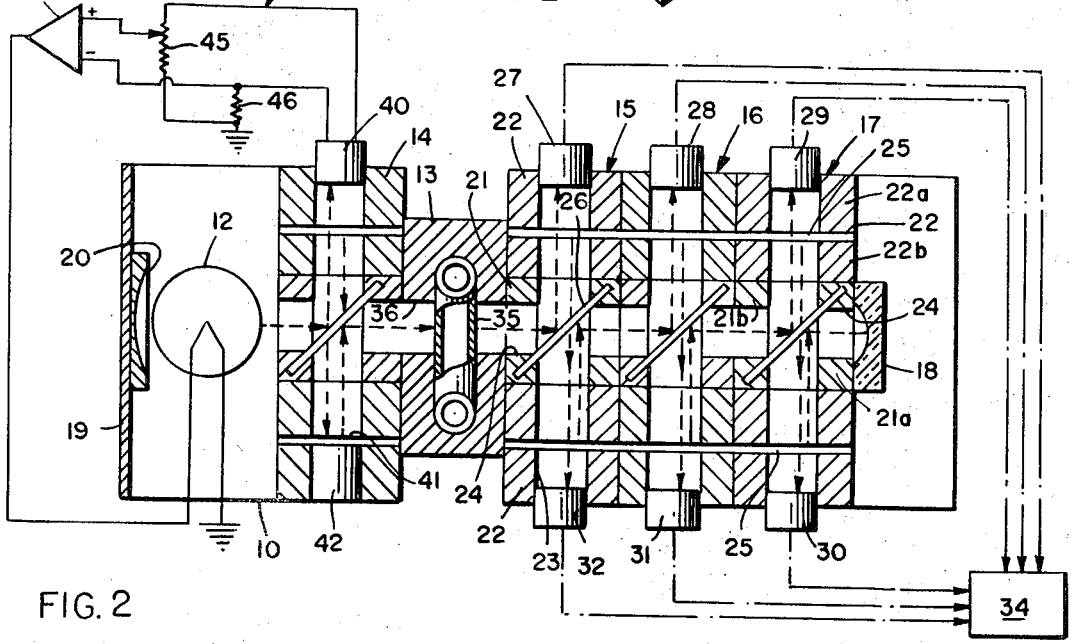

FIG. 1 is a perspective view of a spectro-photometer assembly embodying the present invention;
FIG. 2 is a section and partially diagrammatic view taken along line 2—2 of FIG. 1.

DESCRIPTION

The assembly illustrated in FIG. 1 consists essentially of a frame 10 having an elongated horizontal surface 11 upon which are mounted a light source 12, a cuvette block 13, a plurality of photocell modules 14–17, and end or terminal reflecting units 18 and 19. In the illustration given, the terminal reflector portion 19 is formed integrally with the frame and is equipped with a concave mirror 20 disposed behind light source 12. The light source, which takes the form of an incandescent bulb, would normally be completely shielded, permitting light only to enter into the passages hereinafter described, but for clarity of illustration such shielding means, which may take any conventional form, has been omitted.

It is also to be understood that means should be provided for maintaining a constant operating temperature for the assembly during use thereof. Such means, such as a thermostatically controlled water bath and thermal insulation, are entirely conventional and well known in the art. For clarity of illustration they too have been omitted from the drawings.

Modules 15, 16, and 17 are identical except for the light-transmitting characteristics of the filters disposed therein. Each of such modules is in the general shape of a block having rectangular sides and, as shown in the drawings, extends transversely with respect to frame 10. To simplify manufacture, assembly, and repair, each of the modules may be composed of a central section 21 and a pair of identical lateral sections 22. A transverse bore or passage 23 extends through each complete module 15–17, and a main passage 24, extending longitudinally with respect to the frame and aligned with light source 12, passes through the central section of each module. It will be observed frfom FIG. 2 that the passages 24 through the respective modules 15–17 are coaxial and together form an elongated straight passage which is aligned with the light source and which intersects all of the transverse passages 23.

The lateral sections 22 of models 15–17 each contain a filter 25 extending normal to the axis of the transverse passage extending through the module. To simplify manufacture and to insure precise positioning of the filters within the modules, each lateral section 22 may in turn be composed of two sub-sections 22a and 22b, as illustrated in FIG. 2. The flat glass filters 25 may then be sandwiched between the sub-sections and fixed in place by an adhesive or by any other suitable means. While the filter plates 25 in the various modules are substantially identical in confiuration, each is distinctive in its capacity to transmit only certain wave lengths of light while at the same time reflecting light of all other wave lengths. Since the characteristics of such filters are well known in the art, further discussion is believed unnecessary herein. It is to be emphasized, however, that each of the filters 25 reflects the light which it does not transmit, the inwardly facing surface thereof being provided with a mirror finish for that purpose.

The central section 21 of each module 15–17 contains a beam-splitting element 26 in the form of a glass plate which extends in a vertical plane at 45 degree angles with respect to both the main passage 24 and the transverse passage 23. Here again, to simplify manufacture and insure accurate positioning of the beam-splitting plates, each central section 21 may be composed of identical subsections 21a and 21b with the plates 26 secured diagonally there-between when the parts are assembled as shown in FIG. 2.

The beam-splitting plates 26 may be formed from any suitable glass having a high degree of clarity or transparency. The surfaces must be smooth and flat so that a minor proportion of the light impinging on each plate will be reflected at right angles, the remainder being transmitter through the plate. It has been found that with glass of optical grade approximately 10 percent of the incident light is reflected and approximately 90 percent transmitted.

The lateral sections 22 of modules 15–17 each contain an electrically resistive photocell 27–32 disposed outboard of the filter 25 of each section. In the illustration given, such photocells are standard cadmium sulfide cells, each cell having its photoresistive element facing inwardly along the transverse passage of the module to receive those wave lengths of light transmitted by the filter adjacent thereto. Blocking means in the form of screw elements 33 (FIG. 1) may be interposed between each photocell and its adjacent filter to control the amount of light impinging on the cell. By screwing the threaded elements 33 into or out of the path of light directed against each photocell, all of the photocells may be adjusted to operate at approximately the same impedance.

The output of each photocell 27–32 is directed to a suitable switching means 34 which in turn is associated with conventional recording or read-out means (not shown). By manual or automatic adjustment of the switching means 34, the output of any one photocell of the group may be selected for analysis.

Cuvette block 13 contains a cuvette 35 which consists of a container having transparent glass walls 35a and 35b which extend transversely through passage 36 in the block. Inlet and outlet tubes 37 and 38 communicate with the cuvette chamber for introducing samples, including blanks and standards, into such chamber and for withdrawing such samples therefrom. As will be observed from FIG. 2, passage 36 of the cuvette block is in alignment with the main passage extending through the battery of photocell modules, and the transparent walls 35 of the cuvette extend in directions normal to a path of light extending axially through the passage.

Between the cuvette and light source 12 is a photocell module 14 identical to modules 15–17 except that only a single photocell 40 is provided rather than an opposing pair of such photocells. In the absence of a photocell arranged in opposition to cell 40, a full mirror 41 is substituted for a reflective filter and, as shown in FIG. 2, the transverse bore 23 outboard of the mirror 41 is sealed by a suitable plug 42.

Photocell 40 is an electrically resistive photocell similar to cells 27–32 and is one component of an intensity regulator generally designated in FIG. 2 by the numeral 43. As shown diagramatically, the intensity regulator also includes a difference amplifier 44, a potentiometer 45, and a resistor 46. The current flowing through the resistor 46 from the output lead of the photocell 40 is a function of the intensity of the incident light so the voltage signal at the negative input of the difference amplifiler 44 varies as the intensity of the light. The positive input of the difference amplifier is received from the movable contact of the potentiometer 45 which serves as means for generating a reference potential for the amplifier.

As the wiper arm of the potentiometer is moved along the fixed resistor thereof, the reference input to the difference amplifier 44 is altered, thereby permitting selective setting of the intensity of light source 12 by variation in the current through the filament of that source. As the signal to the negative input of the amplifier decreases, the output current of the amplifier will increase, thereby increasing the current through the filament of light source 12 and increasing the light, thus raising the signal at the negative input of the difference amplifier until it reaches the level generated by potentiometer 45.

Broken line arrows in FIG. 2 indicate the paths of light through the photometer. Light from source 12 passes into main passage 24 where it impinges on the beam splitter 26 in the first module 14. Approximately 10 percent of the incident light is reflected towards photocell 40, the remainder passing through the glass plate and through cuvette 35. The light exciting from the cuvette travels down the main passage extending through modules 15–17 and, as the light impinges on each of the angularly-oriented beam-splitting plates 26 in the respective modules, a minor proportion of the incident light is reflected laterally into transverse passages 23. Thus, approximately 10 percent of the light passing directly from the cuvette to the beam splitter 26 in module 15 is reflected toward photocell 27. Such light impinges on the filter 25 adjacent cell 27, the filter permitting only certain wave lengths to pass therethrough and reflecting back towards the beam splitter all other wave lengths. The major proportion of the light reflected by such filter passes through the beam splitter and strikes the filter adjacent photocell 32 directly opposite from photocell 27. Here again, the filter passes certain wave lengths to photocell 32, reflecting all others back towards the beam splitter which in turn reflects a portion of the incident light down the main passage towards the beam splitters disposed between the remaining pairs of photocells. Light reaching the end of the main passage is reflected back by reflector 18. The result is that all of the available light from source 12 passing into the main passage is reflected and distributed uniformly to all of the photocells 27–32 or, more accurately, to all of the reflective filters associated directly with such photocells. Each of the filters transmits only selected wave lengths within the range of 400 to 700 m$\mu$ (millimicrons); for example, photocell 27 may receive only wave lengths approximating 450 m$\mu$, photocell 28 may receive only wave lengths approximating 500 m$\mu$, photocell 29 may receive only wave lengths approximating 540 m$\mu$, etc.

It is believed apparent from the foregoing that the filter photometer of the present invention is particularly suitable for use in conjunction with automatic analysis equipment where a series of samples (including standards) may be passed through the cuvette at regularly timed intervals and where such samples must be read at different wave lengths. By coordinating the switching means 34 with each sample, the output of the appropriate photocell may be received and each sample may be analyzed at the proper wave length required by the particular test involved. Since each photocell is always associated with the same filter and receives only the certain wave lengths transmitted by that filter, the undesirable persistence effects which result when a cadmium sulfide resistive photocell must react to different wave lengths in successive tests are completely avoided.

While in the foregoing we have disclosed an embodiment of the invention in considerable detail for purposes of illustration, it will be understood by those skilled in the art that many of these details may be varied without departing from the spirit and scope of the invention.

We claim:
1. A photometer comprising a frame, a light source mounted thereon, a curvette having a light passage therethough aligned with said source, a plurality of photocell modules having coaxial passages together defining a main passage longitudinally aligned with the passage of said curvette, each of said modules also having a transverse passage intersecting said main passage thereof at right angles, said modules each being provided with at least one electrically resistive photocell in the transverse pas- sage thereof at a point spaced from said main passage and also being provided with a light-reflecting filter disposed in said transverse passages between said photocell and said main passage, beamsplitting means disposed in said modules at the intersections of said main and transverse passages for reflecting a portion of the incident light towards the photocell of each module and for transmitting the remainder of said incident light, means at the end of said main passage opposite from said source for reflecting light back into said passage, and utilization means connected with said photocells utilizing the output of said photocells.

2. The structure of claim 1 in which said beamsplitting means for reflecting light at the intersections of said main and transverse passages comprises a plurality of glass plates disposed at said intersections, each plate extending in a plane at 45 degrees with respect to said main and transverse passages.

3. The structure of claim 2 in which said glass plates reflect a minor portion of the light incident thereon and transmit the remainder of such light.

4. The structure of claim 3 in which said plates reflect approximately 10 percent of the incident light and transmit approximately 90 percent of such light.

5. The structure of claim 1 in which said photocells are cadmium sulfide cells.

6. The structure of claim 1 in which each one of the light-reflecting filters associated with said photocells transmits different wave lengths of light than the other of said filters.

7. The structure of claim 1 in which means are provided for automatically regulating the intensity of said light source, said intensity regulating means including one of said photocells.

References Cited
UNITED STATES PATENTS 3,376,426  4/1968  Frommer et al.  250—226 X RONALD L. WIBERT, Primary Examiner R. J. WEBSTER, Assistant Examiner U.S. Cl. X.R.

356—181; 250—226, 220, 218, 43.5